June 7, 1927.

R. E. BADIN 1,631,909

LIQUID LEVEL INDICATOR

Filed Jan. 12, 1924

Inventor
R. E. Badin
By Marks & Clerk
Attys

June 7, 1927. 1,631,909
R. E. BADIN
LIQUID LEVEL INDICATOR
Filed Jan. 12, 1924   2 Sheets-Sheet 2

Inventor
R. E. Badin
By Marks & Clerk
Attys.

Patented June 7, 1927.

1,631,909

UNITED STATES PATENT OFFICE.

RAOUL EDOUARD BADIN, OF PARIS, FRANCE.

LIQUID-LEVEL INDICATOR.

Application filed January 12, 1924, Serial No. 685,874, and in France December 11, 1923.

My invention relates to a liquid level indicator carrying into effect the method of measurement which consists in the adjustment, to a value equal or proportional to the height of a liquid mass to be measured, of an air pressure capable of acting at a distance upon one or more receiving manometers which are suitably graduated.

Air pressure has been employed for transmitting the indications of levels for a long time since in instruments termed hydrometers. But in these either the compressed air leaks out continuously or else an objectionable excess of liquid fills the hydrometer pipe.

My invention does away with these inconveniences to this effect, I place in communication with the bottom of the reservoir containing the liquid to be measured a case containing a mechanism for regulating the gas pressure, for instance a manometric expansion device, and the latter is supplied by a very small feed of gas whose pressure can thus be made to depend upon the hydrostatic pressure prevailing around the said regulator. This hydrostatic pressure which is evaluated by the action of the gas pressure on manometer gauge, will thus give the measurement of the height of the liquid.

Figure 1:
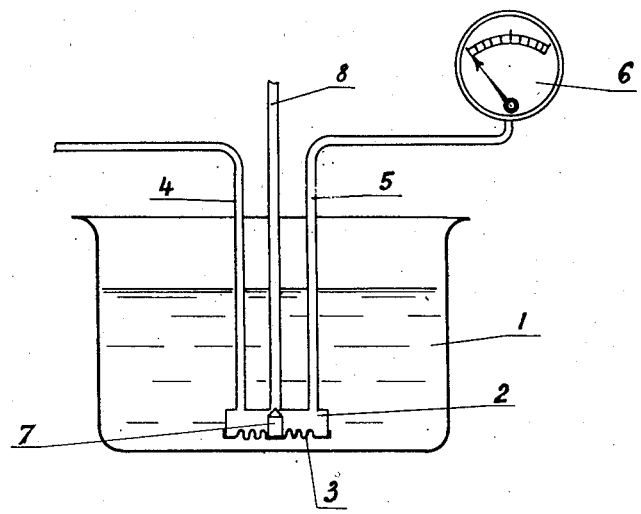
Fig. 1 is a diagrammatical view of an embodiment of my invention.

In the reservoir containing liquid, 1 is immersed a small pressure capsule 2 whereof the bottom consists of an elastic diaphragm 3; said capsule receives through a pipe 4 a small inflow of compressed air and is connected by a pipe 5 with a receiving manometer gauge 6. This gauge indicates values such as the values of the liquid depth which are obviously proportional to the differences of pressure exerted on it. The centre of the said diaphragm is attached to a discharge valve 7 moving by reason of the deformations of the diaphragm in cooperation with the end of the tube 8 connected with the atmosphere.

The operation is as follows:

In the inoperative position, the hydrostatic pressure of the liquid tends to raise the said diaphragm and to hold the said valve in contact with the tube 8, thus cutting off the connection with the atmosphere. Upon opening the compressed air inlet, the pressure will slowly rise in the tight capsule 2 and will become equal to the hydrostatic pressure on the other side of the diaphragm. When this occurs, the said diaphragm which is urged upon both sides and at all points thereof at equal and contrary pressures, is now entirely released, and the slightest excess of air pressure over the pressure of the liquid will cause it to descend, thereby opening the said valve, and this will at once cause a fall in this air pressure, so that the diaphragm again rises and the valve is closed.

The compressed air which continues to flow into the capsule 2 (now fluidtight) will again occasion a rise of pressure which continues until the valve begins to open, and so on, the action being repeated in a periodic manner, so that the air pressure in the capsule 2 will attain by the successive vibrations a mean value which will be nearer the hydrostatic pressure of the liquid when as the diaphragm is of a more flexible nature and has a larger diameter in relation to the diameter of the valve, and when the air inflow section is smaller with reference to the section of the outlet.

The said arrangement possesses the following particular advantages:

1. It provides in the best conditions for the separation between the liquid and the spaces exclusively intended for the air. As stated thereinabove, it thereby avoids the accidental presence of liquid in the pipe and the consequent want of accuracy in the indications of the manometer gauge which occurs in the apparatus where the compressed air flows out directly through the liquid. The present arrangement can be used even below the level of the liquid which is impossible in the last mentioned devices. It is moreover much more precise than latter apparatus as the compressed air has not to force its way through the liquid but merely moves the diaphragm as soon as its pressure is superior by a very small quantity to that of the liquid.

2. Since the spaces inside the capsule are very small and the inertia of the mechanical parts in motion is also very small, the indications will be instantaneous and will not suffer, as is the case for indications given by float level devices, from any shocks or jarring to which the reservoir may be subjected.

The said diaphragm, which is constantly subjected on both sides and at all points thereof to equal and contrary pressures, will never be exposed to abnormal stress and may therefore be made very thin, whereby it becomes responsive to the slightest difference in the said pressures in either direction.

Figure 2:
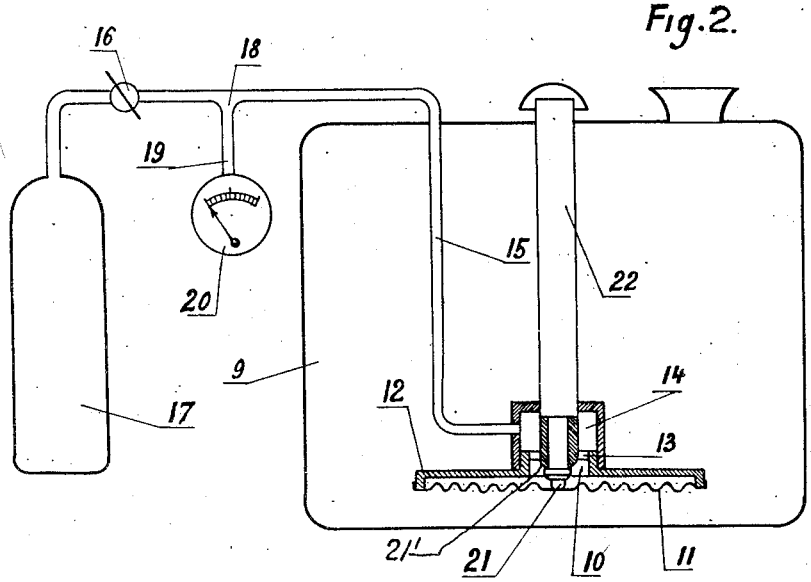
Fig. 2 shows in sectional elevation, by way of example, a constant feed apparatus for an open air reservoir.

Fig. 2 shows by way of example a constant feed apparatus constructed on the above-mentioned principle, for use with an open reservoir.

In the said reservoir 9 is immersed a pressure capsule 10 whereof the bottom consists of a very thin corrugated elastic diaphragm 11, this being placed at a short distance from a stationary disc 12; said capsule is connected by small orifices 13 with an annular chamber 14 which is connected by a pipe 15 (having the cock 16) with a compressed air tank 17. From the point 18 of the said pipe, situated between said cock and the capsule 10, is branched a conduit 19 leading to a manometer gauge 20. The diameter of the pipe 15 should be sufficient in order that the loss of pressure necessary for the very slow flow of air between the point 18 and the capsule 10 shall be negligible, and that the pressure at the point 18 shall be practically equal to the pressure in the said capsule.

To the center of said diaphragm is secured a valve 21 which is preferably flat in order to insure the instantaneous opening and closing of the same on its seat. This seat 21' is formed at the lower end of the outlet conduit 22 which allows the air in the capsule to be discharged into the atmosphere. This apparatus operates in exactly the same manner as the one above mentioned, and it is observed that the immersed capsule constitutes in fact a simple manometric expansion element serving to equilibrate the internal pressure of the air and the external pressure exercised by the liquid upon the diaphragm.

Figure 3:
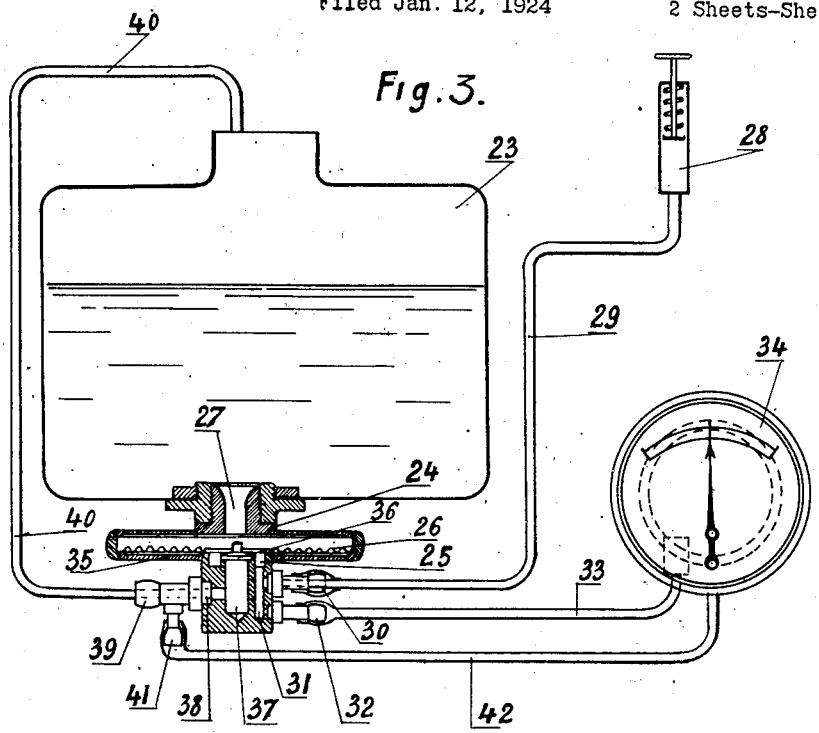
Fig. 3 is a like view of an intermittent feed apparatus for a reservoir under pressure.

Fig. 3 shows by way of example an intermittent feed device for a reservoir subjected to an internal air pressure, as occurs chiefly in certain aeroplane reservoirs.

To the bottom of the reservoir 23 containing the liquid under measurement is secured for example by a screw coupling a small cylinder 24 whereof the lower part forms a pressure chamber 25. A corrugated elastic diaphragm 26 closes the top of the said chamber and it is subjected on one side to the pressure of the liquid in the reservoir 23 through the duct 27, and on the other side to the pressure of compressed air supplied by a spring pump 28 which is set for action just before making a measurement. The compressed air is admitted through a pipe 29 which is secured to a coupling piece 30 on the cylinder 24 communicating through the duct 31 with the chamber 25. A second coupling piece 32, also connected with the duct 31, has secured thereto a pipe 33 connected with the manometer gauge 34.

The diaphragm 26 is so disposed that when the pressure of the liquid is solely exercised, it will rest upon the fixed disc 35; it has at the centre a valve 36 co-operating with the end of a conduit 37 connected with the discharge duct 38 having at the end thereof a coupling piece 39 to which is secured the pipe 40 connected with the air space above the liquid in the said reservoir. A second coupling piece 41 which is also connected with the discharge duct 38 has secured thereto a pipe 48 leading to the manometer gauge 34 which thus communicates with the said air space of the reservoir.

The operation is as follows:

In the preceding apparatus relative to a reservoir which is open to the atmosphere, it has been observed that the operation is independent of the atmosphere surrounding the manometric mechanism, the discharge orifice and the surface of the liquid; so that this surrounding pressure may have any desired value, provided it is exercised equally and simultaneously at these three points. But in the present case, in which the reservoir is subjected to an additional air pressure P, it is necessary (and sufficient) to bring to the said pressure P the atmosphere surrounding the manometer and the discharge orifice, in order that the above-mentioned conditions may be met with in the present case, and that the device will exclusively measure the hydrostatic pressures on the diaphragm. This result is obtained by the communications made by the pipes 40 and 42 between the discharge orifice, the manometer and the air space in the reservoir 23. In these conditions, the operation is the same as above described.

In the present form of construction, the pipe 33 of the gauge 34 is made independent of the pipe 29 of the pump 28, so as to allow the measurement of the pressure at great distances by means of piping of small diameter.

Figure 4:
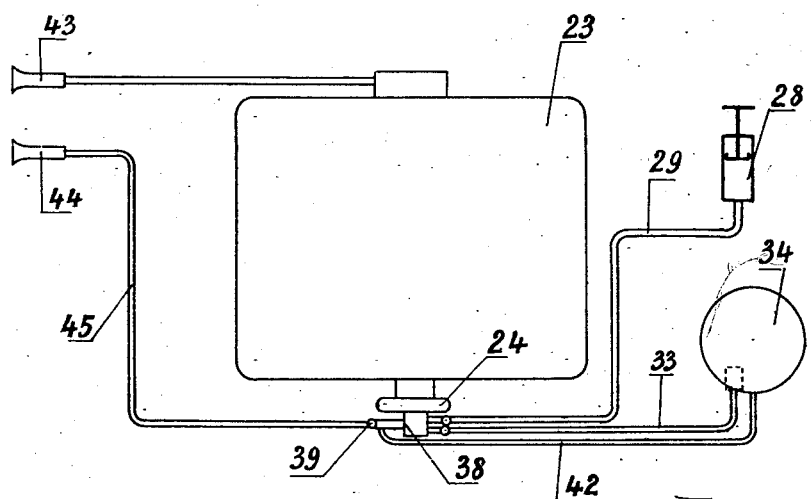
Fig. 4 is a modification of the latter, applicable to reservoirs for aeroplanes.

In reservoirs of the aeroplane type, the additional pressure P is often obtained by the velocity of the air entering an intake conduit placed at the front of the aeroplane. Fig. 4 shows a modification of the device illustrated in Fig. 3, corresponding to this particular case, in which the additional pressure to be exercised upon the manometer and the discharge orifice is obtained by the use of a second air intake conduit placed adjacent the first and suitably arranged.

The additional pressure in the reservoir 23 is obtained by the action of the air entering the intake conduit 43. Adjacent the latter is a second and like conduit 44 connected by the pipe 45 with the discharge orifice 38, and by the pipes 45 and 42 with the manometer 34. It is observed that with this disposition no splashing of liquid fuel can occur in the pipes 45 and 42.

What I claim is:

1. In a liquid level indicator the combination of a pressure chamber immersed in the liquid at the full depth to be measured, means whereby said chamber is fed by a small inflow of compressed gas, an elastic diaphragm forming a wall of this chamber and subjected to the pressure of the liquid, a discharge valve secured to said diaphragm, a discharge tube connected at one end to the pressure chamber and communicating with the interior thereof at a point opposite said discharge valve and extending above the normal level of the liquid, a seat formed in the pressure chamber end of said discharge tube and cooperating with the discharge valve, a manometer gage and means whereby the said gage is adapted to indicate values proportional to the difference between the pressure in the pressure chamber and the pressure above the liquid.

2. In a liquid level indicator the combination of a pressure chamber immersed in the liquid at the full depth to be measured, a compressed air reservoir, a tube connecting said reservoir with the pressure chamber, an elastic diaphragm forming a wall of this chamber and subjected to the pressure of the liquid, a discharge valve secured to said diaphragm, a rigid disc forming the wall of the pressure chamber opposite the diaphragm, a discharge tube connected at one end to the pressure chamber and communicating with the interior thereof at the center of the said rigid disc and extending into the atmosphere above the normal level of the liquid, a seat formed in the lower end of said discharge tube and cooperating with the discharge valve, a manometer gage, a tube connecting said gage with the tube connecting the compressed air reservoir with the pressure chamber and means whereby the said gage is adapted to indicate values proportional to the pressure difference between the last mentioned tube with which it is connected and the atmosphere.

In witness whereof I have hereunto set my hand.

RAOUL EDOUARD BADIN.